United States Patent [19]
Muchmore

[11] Patent Number: 5,398,562
[45] Date of Patent: Mar. 21, 1995

[54] ENGINE/TRANSMISSION DRIVE CONNECTION WITH BRIDGING STARTER GEAR

[75] Inventor: Robert A. Muchmore, West Chester, Ohio

[73] Assignee: General Motors Corporation, Detroit, Mich.

[21] Appl. No.: 63,193

[22] Filed: May 18, 1993

[51] Int. Cl.⁶ ............... F02N 15/02; F16F 15/10
[52] U.S. Cl. ............................................ 74/6; 74/574
[58] Field of Search .......................... 74/6, 574

[56] References Cited

U.S. PATENT DOCUMENTS

| 4,813,295 | 3/1989 | Drexl et al. | 74/574 |
| 5,121,821 | 6/1992 | Poorman et al. | 192/3.28 |

Primary Examiner—John J. Vrablik
Attorney, Agent, or Firm—Donald F. Scherer

[57] ABSTRACT

An engine/transmission drive connection has dual mass damper disposed between the engine output and the transmission input. A pair of starter ring gears are secured to members spanning the damper.

1 Claim, 1 Drawing Sheet

ENGINE/TRANSMISSION DRIVE CONNECTION WITH BRIDGING STARTER GEAR

TECHNICAL FIELD

This invention relates to engine-to-transmission flexible drive connections. More particularly, this invention relates to such drive connections having a spring damper incorporated therein. Specifically, this invention relates to engine starter gear mechanisms incorporated into such drive connections.

BACKGROUND OF THE INVENTION

Automatic transmissions have an engine drive connection in the form of a flex plate or flywheel connected between the engine crankshaft and the torque converter impeller or front cover. The engine starter drive connection or mechanism includes a ring gear secured to the flex plate, flywheel or the torque converter impeller.

To provide for more efficient and pleasant torque transmission, it is proposed to use dual flywheels or flex couplings incorporating a damper such that some of the rotating inertia can be added to the output side of the damper or torque converter. With the conventional engine starter mechanism, this places the starter drive on the input side of the chamber, such that the rotating inertias on the output side of the damper is unrestrained during starting which can introduce noise into the drive system.

SUMMARY OF THE INVENTION

The present invention overcomes these disadvantages by incorporating a starter ring gear on both sides of the damper. The starter pinion will be urged into meshing engagement with both ring gears, thereby effectively removing the damper from the drive path during starting.

It is therefore an object of this invention to provide an improved starter gear structure in an engine/transmission drive connection wherein a vibration damper is employed between the engine output and the transmission input.

It is another object of this invention to provide an improved starter gear structure in an engine/transmission drive connection, wherein the transmission has a torque converter input and a dual mass damper is employed between the engine and transmission, and further wherein a pair of ring gear members are engaged by a starter pinion gear to effectively bridge the damper during engine starting.

These and other objects and advantages of the present invention will be more apparent from the following specification and drawing.

DESCRIPTION OF THE EMBODIMENT

Figure 1:
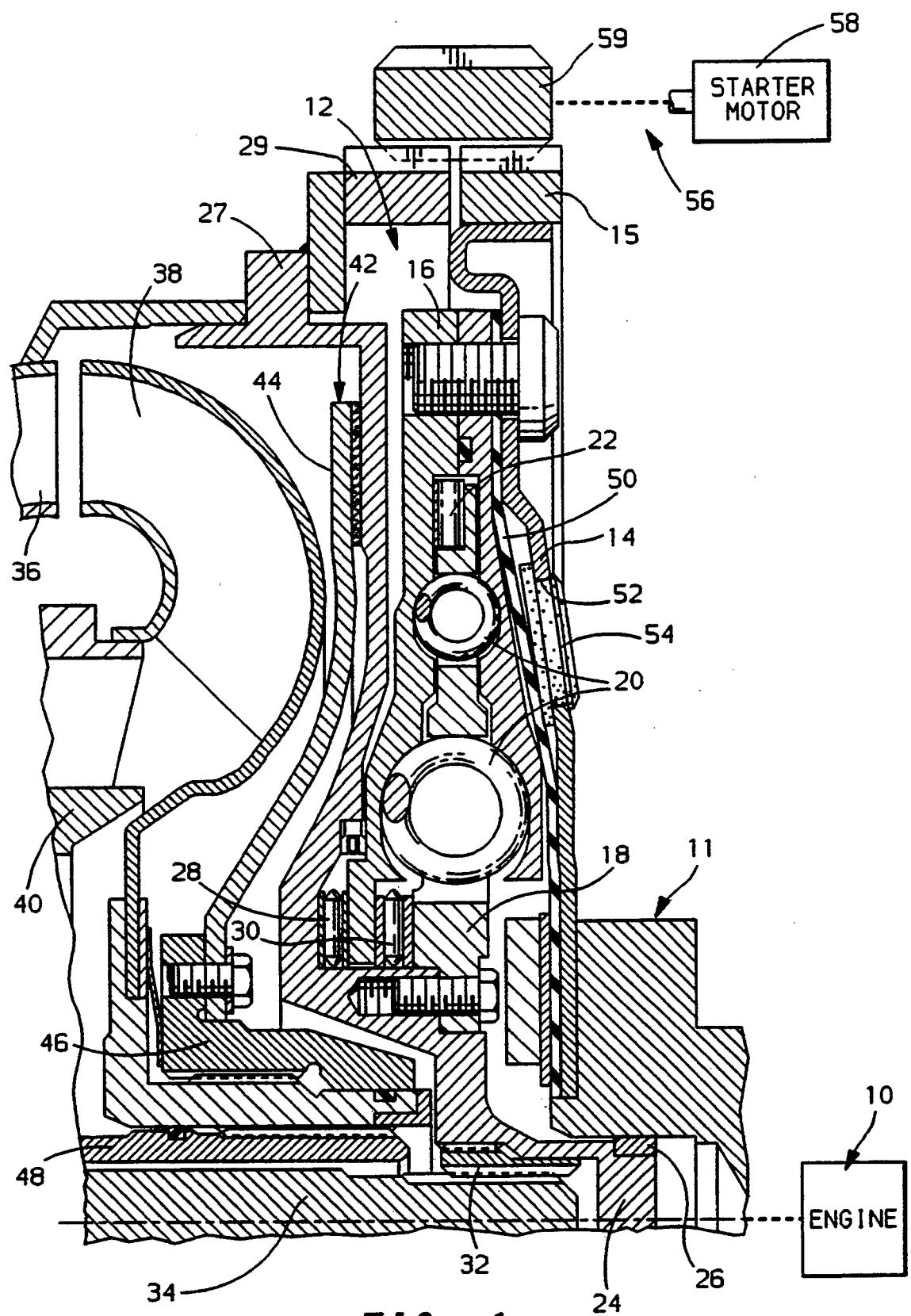
FIG. 1 is an elevational view depicting an engine/transmission drive connection incorporating the present invention.

FIG. 1 represents a portion of the vehicle powertrain incorporating the present invention wherein an engine 10 has an engine crankshaft 11 which is secured to a coupling 12 through a flexplate 14. The flexplate 14 has a starter ring gear 15 secured thereto at the outer diameter thereof. The coupling 12 includes a two-piece housing or engine inertia mass 16, a transmission inertia mass 18, a plurality of isolator springs 20 and a hysteresis friction member 22. The inertia mass 18 is rotatably disposed between the two members of the engine inertia mass 16. The coupling 12 is described in U.S. Pat. No. 5,121,821, issued Jun. 16, 1992, to Poorman et al.

The hysteresis friction member 22 is preferably a wave spring which is frictionally engageable with the transmission inertia 18 and the engine inertia 16. The isolator springs 20 are disposed between the transmission inertia mass 18 and engine inertia mass 16 in a conventional manner. The isolator springs 20 will permit limited relative annular excursion between the transmission inertia mass 18 and the engine inertia mass 16 and will cooperate with the hysteresis friction member 22 to provide isolation between the torsional disturbances of the engine and the transmission inertia mass 16, 18, respectively.

The transmission inertia mass 18 is secured to a torque converter cover 24 which is rotatably supported in the engine crankshaft 11 by a bushing 26 and includes an outer hub 27 to which a starter ring gear 29 is secured. In the "at rest" condition, with the engine not running, the teeth on the starter ring gear 15 are axially aligned with the teeth of the starter ring gear 29. A pair of needle roller bearings 28 and 30 are disposed between the torque converter cover 24 and the engine inertia mass 16 and the transmission inertia mass 18 and engine inertia mass 16, respectively, to accommodate the relative motion therebetween.

The torque converter cover 24 is drivingly connected through a spline connection 32 with a control pump driveshaft 34, which in turn is drivingly connected with a conventional positive displacement fluid pump, not shown. Such pumps are commonly used to provide hydraulic control fluid to operate the power transmission and to fill the fluid torque converter.

The torque converter cover 24 is secured to a torque converter impeller 36 which is disposed in toroidal flow relationship with a torque converter turbine 38 and torque converter stator 40. The impeller, turbine and stator cooperate to form a conventional torque converter, the operation of which is well known such that a further description of its structure and operation is not believed necessary.

The torque converter will permit slippage between the engine input and the turbine output which effectively dampens torsional vibrations and permits torque multiplication during the converter phase. These are the primary purposes for using a torque converter in that the device will permit smooth vehicle deceleration while maintaining the engine at the most appropriate torque output level. The drawback of a torque converter is, of course, that during the coupling phase, slippage between the impeller 36 and turbine 38 is an efficiency loss and therefore affects vehicle fuel economy.

In order to improve the vehicle fuel economy, a torque converter clutch 42 is disposed between the turbine 38 and the cover 24. The torque converter clutch includes an apply piston 44 and a hub 46 which is connected via a spline to the turbine 38. By selectively controlling the flow of fluid through the torque converter, the apply piston 44 can be forced to frictionally engage the torque converter cover 24 thereby eliminating the speed differential or slippage between the impeller 36 and the turbine 38. The turbine 38 is drivingly connected to a turbine shaft 48 which is coupled in a well known manner with a conventional planetary gear transmission, not shown.

When the torque converter clutch 42 is engaged, the torsional vibrations present at engine crankshaft 11 caused by firing frequency of the engine 10, can be transmitted to the shaft 48. The isolator springs 20 and hysteresis friction member 22 are operable to significantly reduce or eliminate the transmission of transient torque spikes imposed on the engine crankshaft 11.

In prior art devices, the spring isolator and friction system is disposed in the torque converter clutch between the apply piston and the turbine. In these systems, the inertia of the torque converter cover 24 and torque converter impeller 36 are additive with the engine inertia while the torque converter turbine inertia is additive to the planetary gear transmission.

The isolator springs 20 separate the engine inertia mass 16 from the transmission inertia mass 18 such that the torque converter impeller 36, torque converter cover 24 and transmission inertia mass 18 are added to the inertia mass of the turbine 38 and the gear transmission, not shown, when the clutch 42 is engaged. This effectively reduces the natural frequency of the vehicle powertrain for any given engine rpm and spring rate of the isolator springs 20.

The coupling 12 is open to the fluid within a transmission and torque converter such that cooling and lubrication of the various components can be accomplished. In order to prevent the fluid from leaking to atmosphere through the flexplate 14, a bladder 50 is disposed between the flexplate 14 and the engine inertia mass 16. In order to properly control the axial flex rate of the flexplate 14, a plurality of openings, such as 52, are formed therein.

To prevent the bladder 50 from being damaged by encountering the edges of the openings 52, an elastomeric grommet 54 is secured in each of the openings 52.

It has been found that these grommets will remain in position during flexing of the flexplate 14 as they are contacted by the bladder 50 and will effectively prevent the bladder 50 from being damaged by the edges of the openings 52.

In the "at rest" position, a conventional starter system 56 having a starter motor 58 and a pinion gear 59 can be energized to urge the pinion gear 59 into engagement with both the starter ring gears 15, 29. This permits the starter motor to rotate engine 10 without interference or noise from the coupling 12.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. An engine starter gear apparatus comprising: an engine output member;
   a transmission input member;
   a damper assembly means for permitting angular excursion between said engine output member and said transmission input member;
   first starter ring gear means secured for continuous rotation with the engine output member;
   second starter ring gear means continuously rotatable with the transmission input member;
   said first and second ring gear means having axially aligned toothed portions which are engageable by a starter gear means to provide a starting drive for said engine and simultaneously bypass the damper assembly means between said engine output member and said transmission input member.

* * * * *